United States Patent
He et al.

(10) Patent No.: US 10,396,921 B2
(45) Date of Patent: Aug. 27, 2019

(54) MULTI-LANE SYNCHRONIZATION METHOD, SYNCHRONIZATION APPARATUS AND SYSTEM, AND COMPUTER STORAGE MEDIUM

(71) Applicant: Sanechips Technology Co.,Ltd., Shenzhen (CN)

(72) Inventors: Kaijiang He, Shenzhen (CN); Junfeng Peng, Shenzhen (CN)

(73) Assignee: Sanechips Technology Co., Ltd., Shenzhen, Guangdong Province (CN)

( * ) Notice: Subject to any disclaimer, the term of this patent is extended or adjusted under 35 U.S.C. 154(b) by 190 days.

(21) Appl. No.: 15/323,322

(22) PCT Filed: Oct. 31, 2014

(86) PCT No.: PCT/CN2014/090097
§ 371 (c)(1),
(2) Date: Dec. 30, 2016

(87) PCT Pub. No.: WO2016/000371
PCT Pub. Date: Jan. 7, 2016

(65) Prior Publication Data
US 2017/0155458 A1    Jun. 1, 2017

(30) Foreign Application Priority Data

Jun. 30, 2014  (CN) .......................... 2014 1 0309409

(51) Int. Cl.
*H04J 3/06* (2006.01)
*H04L 29/06* (2006.01)
(Continued)

(52) U.S. Cl.
CPC ............ *H04J 3/0658* (2013.01); *H04L 25/14* (2013.01); *H04L 69/22* (2013.01); *H04L 1/0083* (2013.01)

(58) Field of Classification Search
CPC ........ H04J 3/0658; H04L 69/22; H04L 25/14; H04L 1/0083; H04B 10/60
See application file for complete search history.

(56) References Cited

U.S. PATENT DOCUMENTS 5,887,039 A  *  3/1999  Suemura ............... H04J 3/0602
                                                      375/365
6,215,798 B1 *  4/2001  Carneheim ............. H04L 7/043
                                                      370/515
(Continued)

FOREIGN PATENT DOCUMENTS

CN        101237318 A     8/2008
CN        101499845 A     8/2009
(Continued)

OTHER PUBLICATIONS

Supplementary European Search Report in European application No. 14896786.2, dated Sep. 7, 2017.
(Continued)

*Primary Examiner* — Shailendra Kumar
(74) *Attorney, Agent, or Firm* — Ling Wu; Stephen Yang; Ling and Yang Intellectual Property

(57) ABSTRACT

Disclosed are a multi-lane synchronization method and apparatus. The method includes: forming N data frames, frame headers of the N data frames including an identical frame header sequence, N being greater than or equal to 1 and less than or equal to the number of lanes M, and M being an integer not less than 2; and sending the N data frames via N lanes, wherein different data frames are sent via different lanes, and the frame header sequence is configured to perform frame synchronization between a receiving end and a sending end or to check frame synchronization. Also disclosed are a synchronization system and a computer storage medium.

11 Claims, 9 Drawing Sheets

(51) Int. Cl.
    *H04L 25/14*    (2006.01)
    *H04L 1/00*    (2006.01)

(56) References Cited

U.S. PATENT DOCUMENTS

| 2001/0000701 | A1 | 5/2001 | Carneheim |
| 2012/0027419 | A1 | 2/2012 | Kaneda |
| 2012/0141116 | A1* | 6/2012 | Zeng .................. H04J 3/14 398/1 |
| 2017/0142677 | A1 | 5/2017 | He et al. |
| 2017/0155458 | A1 | 6/2017 | He et al. |

FOREIGN PATENT DOCUMENTS

| CN | 101577580 | A | 11/2009 |
| CN | 101710891 | A | 5/2010 |
| CN | 201860341 | U | 6/2011 |
| CN | 102742239 | A | 10/2012 |
| CN | 102752257 | A | 10/2012 |
| CN | 102832981 | A | 12/2012 |
| DE | 69838759 | T2 | 10/2008 |
| JP | S62173833 | A | 7/1987 |
| JP | S62173833 | U | 11/1987 |
| JP | 03016330 | A | 1/1991 |

OTHER PUBLICATIONS

Partial Supplementary European Search Report in European application No. 14896786.2, dated December Jun. 6, 2017.
International Search Report in international application No. PCT/CN2014/090097, dated Apr. 9, 2015.
English Translation of the Written Opinion of the International Search Authority in international application No. PCT/CN2014/090097, dated Apr. 13, 2015.
International Search Report in international application No. PCT/CN2014/090183, dated Mar. 25, 2015.
English Translation of the Written Opinion of the International Search Authority in international application No. PCT/CN2014/090183, dated Mar. 25, 2015.
Supplementary European Search Report in European application No. 14896875.3, dated Apr. 28, 2017.

* cited by examiner

MULTI-LANE SYNCHRONIZATION METHOD, SYNCHRONIZATION APPARATUS AND SYSTEM, AND COMPUTER STORAGE MEDIUM

TECHNICAL FIELD

The disclosure relates to a synchronization technology in the field of communications, and in particular to a multi-lane synchronization method, a synchronization apparatus and a synchronization system, and a computer storage medium.

BACKGROUND

A frame synchronization technology plays a very important role in optical communications and mainly implements a frame header marking function so as to provide frame header indication information for subsequent data processing. Moreover, a synchronization state of a system is indicated, which reflects the advantages and disadvantages of channel conditions.

A conventional frame synchronization technology mainly aims at point-to-point single-lane frame synchronization. During point-to-point single-lane frame synchronization, a frame header sequence is set for each lane. If the system has a plurality of lanes, a sending end inserts different frame header sequences into data sent by different lanes respectively during data sending. After receiving the data, a receiving end performs detection and correlation operation on the data from different lanes by using different frame header sequences, thus causing complicated frame synchronization operation, great system resource consumption or the like.

SUMMARY

In view of this, the embodiments of the disclosure are intended to provide a multi-lane synchronization method, a synchronization apparatus and a synchronization system, and a computer storage medium, capable of achieving multi-lane frame synchronization to simplify frame synchronization.

The technical solutions according to the embodiments of the disclosure are implemented as follows.

According to the first aspect of the embodiments of the disclosure, a synchronization method is provided including:

forming N data frames, frame headers of the N data frames including an identical frame header sequence, N being greater than or equal to 1 and less than or equal to the number of lanes M, and M being an integer not less than 2; and sending the N data frames via N lanes, wherein different data frames are sent via different lanes, wherein the frame header sequence is configured to perform frame synchronization between a receiving end and a sending end or to check frame synchronization.

Based on the foregoing solution, the frame headers of the data frames may further include system synchronization information;

system synchronization information of different data frames sent at the same time may be different; and the system synchronization information may be configured to provide basis for the receiving end to detect system synchronization.

Based on the foregoing solutions, the system synchronization information and lane identification information of the lanes may have a mapping relationship; and sending the N data frames via the N lanes may be:

determining a lane for sending each of the data frames according to the system synchronization identification information; and carrying and sending each of the data frames in the determined lane.

Based on the foregoing solutions, vector data may be divided into I-path data and Q-path data; the I-path data may be carried in a first data frame; the Q-path data may be carried in a second data frame;

J lane sets may be formed by the N lanes, each of the lane sets including two lanes, and J being an integer not less than 1; and sending the N data frames via the N lanes may be:

carrying and sending the first data frame and the second data frame corresponding to identical vector data in different lanes of one lane set, the system synchronization information being also configured to represent a binding relationship between the first data frame and the second data frame.

Based on the foregoing solutions, after one of the lanes continuously sends a predetermined number of data frames via first system synchronization information, second system synchronization information may replace the first system synchronization information to send subsequent data frames.

According to the second aspect of the embodiments of the disclosure, a synchronization method is provided including:

receiving a data frame from a lane, and totally receiving N data frames, wherein N is greater than or equal to 1 and less than or equal to the number of lanes M; and performing a correlation operation for frame header data in the N data frames with a local sequence, and detecting the position of a frame header sequence in each data.

Based on the foregoing solution, performing the correlation operation for the frame header data in the N data frames with the local sequence may include:

extracting n data segments of the frame header data of each of the data frames within n detection windows;

performing the correlation operation for each of the data segments and the local sequence; and determining the position of the frame header sequence in each of the data frames according to a result of the correlation operation, wherein n is an integer not less than 1, the size of the detection window corresponds to the number of bits s occupied by the frame header sequence, and s is an integer not less than 1.

Based on the foregoing solutions, before performing the correlation operation for the frame header data in the N data frames with the local sequence, the method may further include:

inputting i-path data with the degree of parallelism i formed by one of the data frames into a detection unit; and wherein extracting the n data segments of the frame header data of each of the data frames within the n detection windows may include:

storing $x^{th}$ i-path data;

receiving $(x+1)^{th}$ i-path data;

forming a $x^{th}$ detection data set by the $x^{th}$ i-path data and the $(x+1)^{th}$ i-path data; and extracting s-path data continuously distributed in the detection data set within each of the detection windows to form the data segments, wherein x is an integer not less than 1, i is an integer not less than 2, and n is less than or equal to i.

Based on the foregoing solutions, n may be equal to i, and
the number of different bits included by two data segments extracted from two adjacent detection windows may be 1.

Based on the foregoing solutions, when n is less than i, extracting the n data segments of the frame header data of each of the data frames within the n detection windows may further include:

dividing the $x^{th}$ detection data set into n data detection sub-sets, each of the data detection sub-sets including continuously-distributed i+(i/n)−1-path data, wherein two adjacent data detection sub-sets include identical i/n-path data;

extracting, by means of each detection window, a $(y-1)^{th}$ data segment in a corresponding data detection sub-set within a $y^{th}$ detection period; and extracting, by means of each detection window, a $y^{th}$ data segment in the corresponding data detection sub-set within a $(y+1)^{th}$ detection period, y being an integer not less than 1, wherein one of the data frames is detected within one of detection periods.

Based on the foregoing solutions, the method may further include:

when it is detected that frame header sequences of successive m1 data frames are all located at a first position, determining that frame synchronization with a sending end is achieved, wherein m1 is an integer not less than 1.

Based on the foregoing solutions, the method may further include:

after determining that frame synchronization with the sending end is achieved, when it is detected that frame header sequences of successive m2 data frames are not located at the first position any longer, determining that frame synchronization with the sending end fails.

Based on the foregoing solutions, frame headers of the data frames may further include system synchronization information; and the method may further include:

extracting the system synchronization information of each of the data frames; and determining, according to the system synchronization information and a predetermined policy, whether system synchronization is abnormal.

Based on the foregoing solutions, determining, according to the system synchronization information and the predetermined policy, whether synchronization of a communication system including a receiving end and a sending end is abnormal may include:

when system synchronization information in any two of the N data frames are identical, determining that system synchronization between the receiving end and the sending end is abnormal.

Based on the foregoing solutions, vector data may be divided into I-path data and Q-path data, the I-path data being carried by a first data frame, and the Q-path data being carried by a second data frame;

the N lanes may be divided into J lane sets, one lane in one of the lane sets may be configured to receive the first data frame, and the other lane may be configured to receive the second data frame, J being an integer not less than 1; and determining, according to the system synchronization information and the predetermined policy, whether synchronization of a communication system including the receiving end and the sending end is abnormal may further include:

when the first data frame and the second data frame are received from different lane sets, determining that system synchronization between the receiving end and the sending end is abnormal.

Based on the foregoing solutions, the system synchronization information and lane identification information of the lanes may have a mapping relationship.

According to the third aspect of the embodiments of the disclosure, a synchronization method is provided including that:

a sending end forms N data frames, frame headers of the N data frames including an identical frame header sequence, and N being greater than or equal to 1 and less than or equal to the number of lanes M;

the sending end sends the N data frames via N lanes, wherein different data frames are sent via different lanes, the frame header sequence being configured to perform frame synchronization between a receiving end and the sending end or to check frame synchronization;

the receiving end receives a data frame from a lane, and totally receives N data frames, wherein N is greater than or equal to 1 and less than or equal to the number of lanes M; and the receiving end performs a correlation operation for frame header data in the N data frames with a local sequence, and detects the position of a frame header sequence in each data.

Based on the foregoing solutions, the frame headers of the data frames may further include system synchronization information;

system synchronization information of different data frames sent at the same time may be different; and the system synchronization information may be configured to provide basis for the receiving end to detect system synchronization.

The frame headers of the data frames may further include system synchronization information; and the method may further include that:

the receiving end extracts the system synchronization information of each of the data frames; and the receiving end determines, according to the system synchronization information and a predetermined policy, whether system synchronization is abnormal.

According to the fourth aspect of the embodiments of the disclosure, a synchronization apparatus is provided including:

a forming unit, configured to form N data frames, frame header of the N data frames including an identical frame header sequence, N being greater than or equal to 1 and less than or equal to the number of lanes M, and M being an integer not less than 2; and a sending unit, configured to send the N data frames via N lanes, wherein different data frames are sent via different lanes, wherein the frame header sequence is configured to perform frame synchronization between a receiving end and a sending end or to check frame synchronization.

Based on the foregoing solutions, the frame header of the data frames may further include system synchronization information;

system synchronization information of different data frames sent at the same time may be different; and the system synchronization information may be configured to provide basis for the receiving end to detect system synchronization.

Based on the foregoing solutions, the system synchronization information and lane identification information of the lanes may have a mapping relationship; and the sending unit may be configured to determine a lane for sending each of the data frames according to the system synchronization identification information, and carry and send each of the data frames in the determined lane.

Based on the foregoing solutions, vector data may be divided into I-path data and Q-path data; the I-path data may be carried in a first data frame; the Q-path data may be carried in a second data frame;

J lane sets may be formed by the N lanes, each of the lane sets including two lanes, and J being an integer not less than 1; and the sending unit may be configured to carry and send the first data frame and the second data frame corresponding to identical vector data in different lanes of one lane set, wherein the system synchronization information also is further configured to represent a binding relationship between the first data frame and the second data frame.

Based on the foregoing solutions, the sending unit may be further configured to replace, after one of the lanes continuously sends a predetermined number of data frames by first system synchronization information, the first system synchronization information with second system synchronization information to send subsequent data frames.

According to the fifth aspect of the embodiments of the disclosure, a synchronization apparatus is provided including:

a receiving unit, configured to receive a data frame from a lane, and totally receive N data frames, wherein N is greater than or equal to 1 and less than or equal to the number of lanes M; and a detection unit, configured to perform a correlation operation for frame header data in the N data frames with a local sequence, and detect the position of a frame header sequence in each data.

Based on the foregoing solutions, the detection unit may include:

an extraction module, configured to extract n data segments of the frame header data of each of the data frames within n detection windows;

an operation module, configured to perform the correlation operation for each of the data segments and the local sequence; and a determination module, configured to determine the position of the frame header sequence in each of the data frames according to a result of the correlation operation, wherein n is an integer not less than 1, the size of the detection window corresponds to the number of bits s occupied by the frame header sequence, and s is an integer not less than 1.

Based on the foregoing solutions, the apparatus may further include:

an input unit, configured to input, before performing the correlation operation for the frame header data in the N data frames with the local sequence, i-path data with the degree of parallelism i formed by one of the data frames into the detection unit; and the extraction module may be configured to store $x^{th}$ i-path data, receive $(x+1)^{th}$ i-path data, form an $x^{th}$ detection data set by the $x^{th}$ i-path data and the $(x+1)^{th}$ i-path data, and extract s-path data continuously distributed in the detection data set within each of the detection windows to form the data segments, wherein x is an integer not less than 1, i is an integer not less than 2, and n is less than or equal to i.

Based on the foregoing solutions, n may be equal to i, and the number of different bits included by two data segments extracted from two adjacent detection windows may be 1.

Based on the foregoing solutions, when n is less than i, the detection unit may be configured to: divide the $x^{th}$ detection data set into n data detection sub-sets, each of the data detection sub-sets including continuously-distributed i+(i/n)−1-path data, wherein two adjacent data detection sub-sets include identical i/n-path data; extract, by means of each detection window, a $(y-1)^{th}$ data segment in a corresponding data detection sub-set within a $y^{th}$ detection period; and extract, by means of each detection window, a $y^{th}$ data segment in the corresponding data detection sub-set within a $(y+1)^{th}$ detection period, y being an integer not less than 1, wherein a data frame is detected within a detection period.

Based on the foregoing solutions, the apparatus may further include:

a determination unit, configured to determine, when it is detected that frame header sequences of successive m1 data frames are all located at a first position, that frame synchronization with a sending end is achieved, wherein m1 is an integer not less than 1.

Based on the foregoing solutions, the determination unit may be further configured to determine, after determining that frame synchronization with the sending end is achieved, that frame synchronization with the sending end fails when it is detected that frame header sequences of successive m2 data frames are not located at the first position any longer.

Based on the foregoing solutions, frame header of the data frames may further include system synchronization information; and the apparatus may further include:

a system synchronization unit, configured to extract the system synchronization information of each of the data frames, and determine, according to the system synchronization information and a predetermined policy, whether system synchronization is abnormal.

Based on the foregoing solutions, the system synchronization unit may be configured to determine, when system synchronization information in any two of the N data frames are identical, that system synchronization between a receiving end and the sending end is abnormal.

Based on the foregoing solutions, vector data may be divided into I-path data and Q-path data, the I-path data being carried by a first data frame, and the Q-path data being carried by a second data frame;

the N lanes may be divided into J lane sets, one lane in one of the lane sets may be configured to receive the first data frame, and the other lane may be configured to receive the second data frame, J being an integer not less than 1; and the system synchronization unit may be further configured to determine, when the first data frame and the second data frame are received from different lane sets, that system synchronization between the receiving end and the sending end is abnormal.

Based on the foregoing solutions, the system synchronization information and lane identification information of the lanes may have a mapping relationship.

According to the sixth aspect of the embodiments of the disclosure, a synchronization system is provided including:

a sending end, configured to form N data frames, frame header of the N data frames including an identical frame header sequence, and N being greater than or equal to 1 and less than or equal to the number of lanes M;

the sending end, configured to send the N data frames via N lanes, wherein different data frames are sent via different lanes, the frame header sequence being configured to perform frame synchronization between a receiving end and the sending end or to check frame synchronization;

the receiving end, configured to receive a data frame from a lane, and totally receive N data frames, wherein N is greater than or equal to 1 and less than or equal to the number of lanes M; and the receiving end, further configured to perform a correlation operation for frame header data in the N data frames with a local sequence, and detect the position of a frame header sequence in each data.

Based on the foregoing solutions, the frame header of the data frames may further include system synchronization information;

system synchronization information of different data frames sent at the same time may be different; and the system synchronization information may be configured to provide basis for the receiving end to detect system synchronization.

The frame header of the data frames may further include system synchronization information; and the receiving end may be further configured to extract the system synchronization information of each of the data frames, and determine, according to the system synchronization information and a predetermined policy, whether system synchronization is abnormal.

According to the seventh aspect of the embodiments of the disclosure, a computer storage medium is provided having computer executable instructions stored therein. The computer executable instructions may be configured to execute at least one of the methods according to the first aspect of the embodiments of the disclosure.

According to the multi-lane synchronization method, the synchronization apparatus and the synchronization system, and the computer storage medium provided by the embodiments of the disclosure, during frame synchronization, frame header sequences inserted into data frames sent by different lanes are identical. Thus, the sending end will not form multiple frame header sequences, and the receiving end may detect frame header sequences of all data frames by using only one local sequence, such that frame synchronization can be simplified, the hardware structure is simplified, and system processing resources are saved.

DETAILED DESCRIPTION

Preferred embodiments of the disclosure will be elaborated below in conjunction with accompanying drawings. It will be appreciated that the preferred embodiments elaborated below are only intended to describe and explain the disclosure and not intended to limit the disclosure.

In the embodiments of the disclosure, frame synchronization is performed by carrying an identical frame header sequence in a plurality of data frames. Compared with a method for performing frame synchronization by carrying different frame header sequences in different data frames, the embodiments of the disclosure can reduce the classes of forming frame header sequences and simplify hardware structures forming the frame header sequences. Moreover, a specific method for performing frame synchronization by means of an identical frame header sequence based on a plurality of data frames is also provided in the embodiments of the disclosure accordingly. Details may be presented in the following embodiments.

Method Embodiment 1

Figure 1:
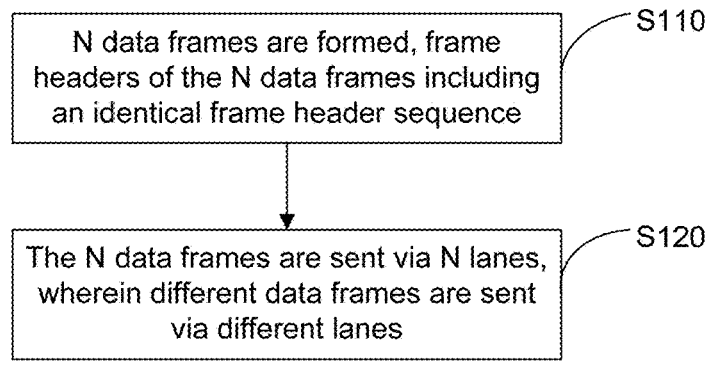
FIG. 1 is a flowchart of a synchronization method according to a method embodiment 1 of the disclosure.

As shown in FIG. 1, this embodiment provides a synchronization method, which includes the following steps.

At Step S110, N data frames are formed, frame header of the N data frames including an identical frame header sequence, N being greater than or equal to 1 and less than or equal to the number of lanes M, and M being an integer not less than 2.

At Step S120, the N data frames are sent via N lanes, wherein different data frames are sent via different lanes.

The frame header sequence is configured to perform frame synchronization between a receiving end and a sending end or to check frame synchronization.

In a specific implementation process, N is an integer greater than 2 usually. The data frames include frame header and data parts. Therefore, the N data frames formed in Step S110 include the frame header and the data parts forming the data frames. Specifically, for example, frame header sequences are inserted into the frame headers of the data frames.

Usually, the data frames may be divided into synchronization frames and service frames, frame header of the synchronization frames and the service frames containing the frame header sequences. The synchronization frames are specially configured to achieve synchronization between a receiving end and a sending end, the data parts thereof being null probably. The data parts of the service frames carry data to be transmitted by the receiving end and the sending end. The frame header sequences in the frame header of the synchronization frames may be configured to perform frame synchronization or to check frame synchronization. Usually, the service frames are data frames sent after it is determined that frame synchronization is achieved, and frame header sequences carried in frame header thereof may be configured to check frame synchronization to judge whether current frame synchronization is abnormal. In a specific implementation process, when frame synchronization is abnormal, the service frames may replace synchronization frames to perform frame synchronization.

Figure 2:
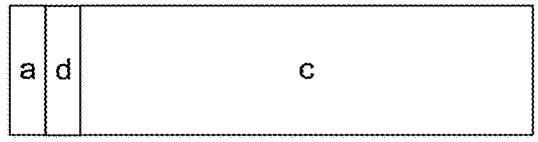
FIG. 2 is a first structural diagram of a frame structure according to a method embodiment 1 of the disclosure.

FIG. 2 shows a data frame. The frame header sequence is represented by a reference sign a, a reference sign c represents a data part of a data frame, and a reference sign d may represent a reserved bit of a frame header or a data bit carrying information such as control information.

In this embodiment, different data frames sent by different lanes carry an identical frame header sequence, and the sending end only needs to form a frame header sequence, thus simplifying insertion of the frame header sequence and a circuit forming the frame header sequence. Moreover, the receiving end only needs a frame header sequence to detect the frame header sequence, such that the detection step of the frame header sequence and the structure of a detection circuit may be simplified.

Based on the foregoing solutions, the frame header of the data frames further include system synchronization information;

system synchronization information of different data frames sent at the same time is different; and the system synchronization information is configured to provide basis for the receiving end to detect system synchronization.

Figure 3:
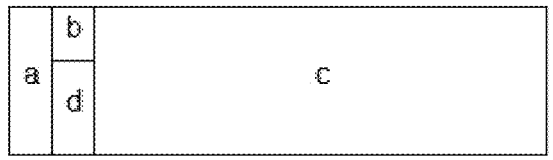
FIG. 3 is a second structural diagram of a frame structure according to a method embodiment 1 of the disclosure.

A data frame shown in FIG. 3 is a data frame with system synchronization information carried, wherein a reference sign b represents the system synchronization information.

During specific implementation, the number of bits occupied by the system synchronization information b in a frame header is less than the number of bits occupied by the frame header sequence a in the frame header.

Therefore, the method of this embodiment further includes: forming unique system synchronization information for each of the data frames in N data frames, and inserting the system synchronization information into the frame header of the data frames after the system synchronization information is formed.

The system synchronization is synchronization on the basis of frame synchronization, and may be configured to determine a transmission time delay or the like. For example, a lane continuously sends a plurality of data frames, and it is predetermined that the first data frame shall reach the receiving end at the first time and the second data frame shall reach the receiving end at the second time. In this case, the first data frame reaches the receiving end at the third time, and the third time is later than the second time, thereby resulting in that the first data frame reaches behind the second data frame, and probably causing abnormal synchronization. Predetermined time at which the data frames reach the receiving end is directly or indirectly represented by the system synchronization information, so that the receiving end judges, after receiving the data frames, whether the system synchronization is abnormal. Herein, a communication system corresponding to the system synchronization is a communication system including the receiving end, the sending end and a channel connecting the receiving end and the sending end.

Based on the foregoing solutions, the system synchronization information and lane identification information of the lanes have a mapping relationship; and sending the N data frames via the N lanes is:

determining a lane for sending each of the data frames according to the system synchronization identification information; and carrying and sending each of the data frames in the determined lane.

The mapping relationship between the system synchronization information and the lane identification information of the lanes may be specifically represented as that: lane serial numbers of the lanes serve as the system synchronization information. For example, current transmission information between the sending end and the receiving end includes four lanes, which are sequenced as 0, 1, 2 and 3. The lane serial numbers are one of the lane identification information.

For example, in Step S110, when a data frame A is formed, a lane serial number inserted into the data frame A serves as the system synchronization information and is inserted into a frame header of the data frame A. If the lane serial number inserted at this time is 0, the data frame A is sent by preferably using a lane 0 in Step S120.

The system synchronization information and the lane identification information have a mapping relationship. For example, the lane serial number serves as the system synchronization information, which makes the implementation easy.

In specific application, vector data is divided into I-path data and Q-path data; the I-path data is carried in a first data frame; the Q-path data is carried in a second data frame;

J lane sets are formed by the N lanes, each of the lane sets including two lanes, and J being an integer not less than 1. Usually, it is preferred to form one lane set by two adjacent lanes. Usually, two lanes in one lane set are adjacent lanes.

Step S120 may be:

carrying and sending the first data frame and the second data frame corresponding to identical vector data in different lanes of one lane set, the system synchronization information being also configured to represent a binding relationship between the first data frame and the second data frame.

It may be judged, according to the system synchronization information of the first data frame and the second data frame, whether two frames of data correspond to two data frames of an identical data vector. If the sending end sends the two data frames corresponding to the identical data vector via a lane set, the receiving end shall also receive the two data frames of the identical data vector within a lane set. Judging whether two data frames within a data set are the two data frames of the identical data vector may be determined according to the system synchronization information.

In conclusion, the system synchronization information provides basis for judging, by the receiving end, whether the first data frame and the second data frame are two frames of data corresponding to the identical data vector, thus making it convenient for the receiving end to further determine whether system synchronization is formed between the receiving end and the sending end according to a formed judgment result.

Specifically, for example, when the system synchronization information and the lane identification information (e.g., lane serial numbers) of the lanes also have a mapping relationship, data sent on a lane 0 and a lane 1 belongs to two frames of data of an identical data vector. In this case, a first data frame sent by the lane 0 includes a lane serial number 0 of the lane 0, and a second data frame sent by the lane 1 includes a lane serial number 1 of the lane 1. For example, the receiving end and the sending end negotiate with each other in advance over that the lane serial number 0 and the lane serial number 1 will be inserted into two data frames corresponding to the identical data vector when being inserted into data frames by serving as the system synchronization information.

In this case, after receiving two data frames, the receiving end may judge, by extracting the system synchronization information, whether the two data frames are two data frames corresponding to an identical data vector according to the system synchronization information and pre-negotiations, and judge whether two lanes receiving the data frames fall within one lane set. If a judgment result is Yes, it is shown that system synchronization between the receiving end and the sending end is normal, and otherwise, it is shown that system synchronization between the receiving end and the sending end is abnormal.

Therefore, the system synchronization information may also be configured to judge, by the receiving end, whether the first path of data and the second path of data corresponding to the identical data vector are received from the same lane set, and determine, according to a judgment result, whether system synchronization is normal.

Further, in order to keep the stability of system synchronization, after one of the lanes continuously sends a predetermined number of data frames by first system synchronization information, the first system synchronization information is replaced with second system synchronization information to send subsequent data frames.

Specifically, the system synchronization information is represented by a lane serial number within first ten data frames sent by the first lane, and the system synchronization information is represented by a lane name within second ten data frames. The lane serial number is the first system synchronization information, and the lane name is the second system synchronization information.

Method Embodiment 2

Figure 4:
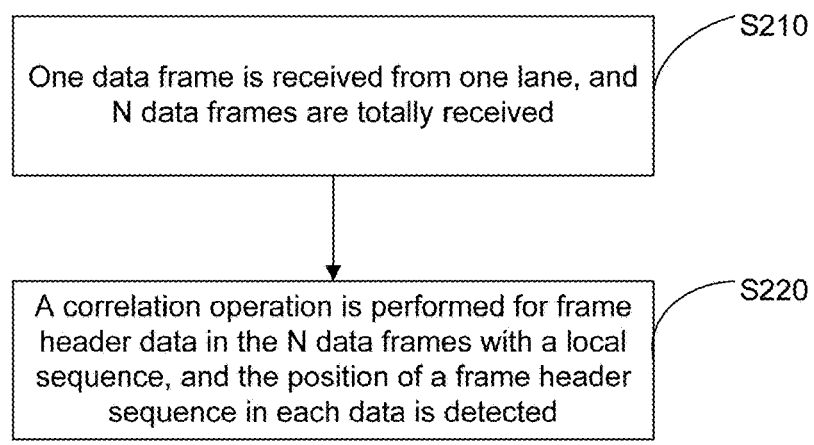
FIG. 4 is a first flowchart of a synchronization method according to a method embodiment 2 of the disclosure.

As shown in FIG. 4, this embodiment provides a synchronization method, which includes the following steps.

At Step S210, a data frame is received from a lane, and N data frames are totally received, wherein N is greater than or equal to 1 and less than or equal to the number of lanes M.

At Step S220, a correlation operation is performed for frame header data in the N data frames with a local sequence, and the position of a frame header sequence in each data is detected.

The synchronization method of this embodiment is preferably applicable to a multi-lane communication system, and therefore a receiving end will receive data frames from one or more lanes at the same time. The data frames include synchronization frames and service frames. Specifically, the difference between the synchronization frames and the service frames may refer to corresponding parts in the method embodiment 1.

In Step S210, frame header sequences included by data frames received from any two lanes are identical, so in Step S220, it is alright to directly detect the frame header sequences in the N data frames by using a local sequence, and it is unnecessary to detect the frame header sequence in each of the data frames by using a plurality of frame header sequences. Specifically, if N=M=4 at present and frame header sequence contained in each of data frames is different from each other, a receiving end needs a corresponding local sequence to successfully detect the frame header sequence in each of the data frames in each of the lanes. If so, after the receiving end receives four data frames, four local sequences are needed to detect each of the data frames, and accordingly, detection needs to be performed for 16 times. However, by means of the method of this embodiment, since the frame header sequences carried by N data frames are identical, it is only necessary to utilize one local sequence to detect for four times.

Therefore, compared with the conventional method, the method of this embodiment is easy to operate, low in system overhead, and low in overhead of hardware for implementing the method of this embodiment.

Figure 5:
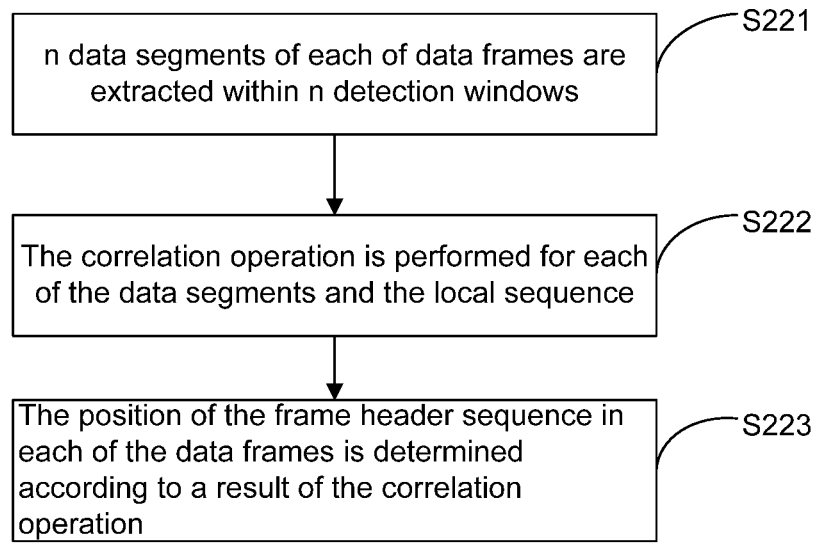
FIG. 5 is a flowchart of detecting a position of a frame header sequence according to a method embodiment 2 of the disclosure.

As shown in FIG. 5, performing the correlation operation for the frame header data in the N data frames with the local sequence includes the following steps.

Step S221: n data segments of the frame header data of each of the data frames are extracted within n detection windows.

Step S222: The correlation operation is performed between each of the data segments and the local sequence.

Step S223: The position of the frame header sequence in each of the data frames according to a result of the correlation operation, wherein n is an integer not less than 1, and the size of the detection window corresponds to a bit number s occupied by the frame header sequence.

When data in the data frames is input into a detection unit in series bit by bit, the detection windows are time-domain detection windows, and data segments with the length of s bits may be extracted by means of the time-domain detection windows.

When the data in the data frames is input into the detection unit in parallel, that is, multiple paths of data are input into the detection unit in parallel at a time, the detection windows correspond to the multiple paths of data continuously distributed at every time. In this case, multiple paths of data input at the same time may be extracted by means of the detection windows to form the data segments including s bits.

In this embodiment, n data segments in each of the data frames are acquired by means of the detection windows according to the foregoing characteristics. Usually, bit numbers included by the detection windows are greater than or equal to bit numbers of the frame header sequences.

Before performing the correlation operation for the frame header data in the N data frames with the local sequence, the method further includes:

inputting i-path data with the degree of parallelism i formed by one of the data frames into a detection unit. Specifically, after receiving data from each lane, the receiving end performs serial-to-parallel conversion to form multiple paths of data corresponding to an identical lane such as 64 paths, thus inputting 64 paths of data into the detection unit at each time.

Figure 6:
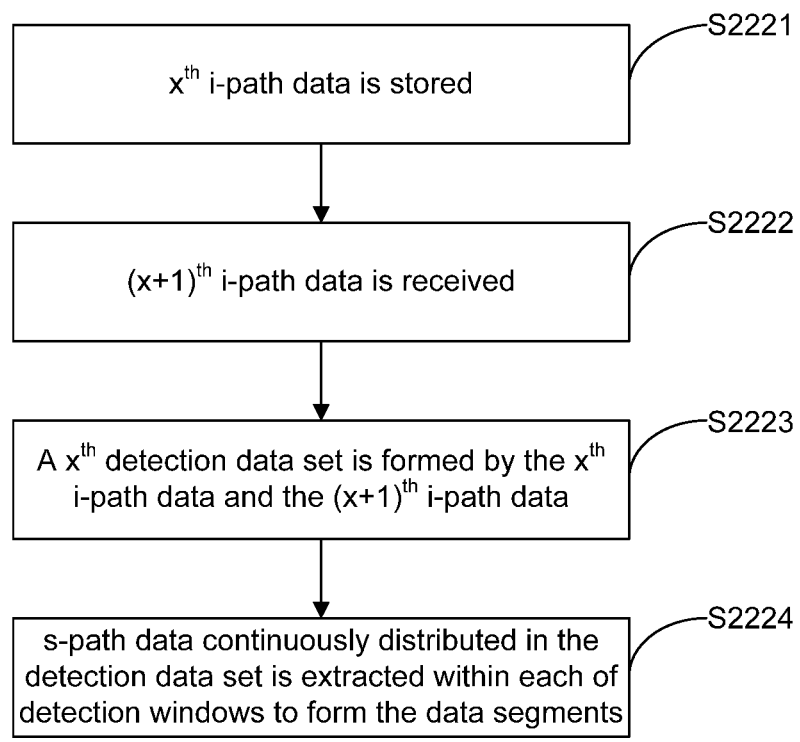
FIG. 6 is a first flowchart showing extraction of n data segments according to a method embodiment 2 of the disclosure.

As shown in FIG. 6, Step S222 includes the following steps.

Step S2221: $x^{th}$ i-path data is stored.
Step S2222: $(x+1)^{th}$ i-path data is received.
Step S2223: A $x^{th}$ detection data set is formed by the $x^{th}$ i-path data and the $(x+1)^{th}$ i-path data.
Step S2224: s-path data continuously distributed in the detection data set is extracted within each detection window to form the data segments, wherein x is an integer not less than 1, i is an integer not less than 2, and n is less than or equal to i.

When multiple paths of data are input into the detection unit in parallel, the detection unit will receive $x^{th}$ i-path data at $x^{th}$ receiving time. After the data is received, the $x^{th}$ i-path data is stored in order to constitute with $(x+1)^{th}$ path data at $(x+1)^{th}$ receiving time to form a detection data set, wherein the $x^{th}$ time is $x^{th}$ time in one detection period. When a detection period re-begins, an x value re-starts to be calculated. Usually, one data frame is detected within one detection period.

Herein, when n is equal to i, the number of different bits included by two data segments extracted from two adjacent detection windows is 1.

Figure 7:
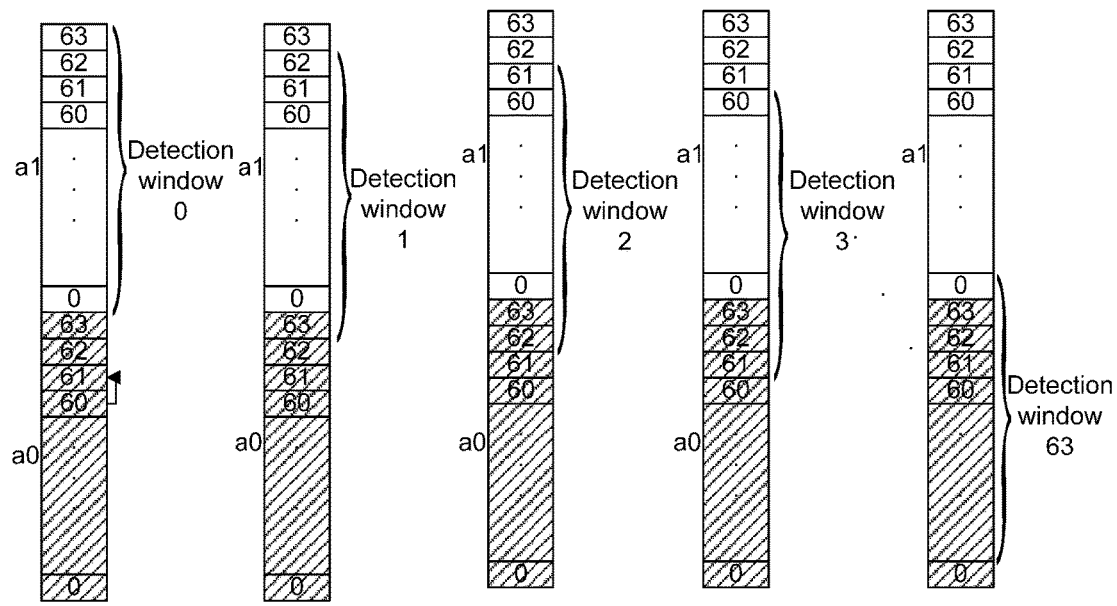
FIG. 7 is a second flowchart showing extraction of n data segments according to a method embodiment 2 of the disclosure.

Specifically, as shown in FIG. 7, after series-to-parallel conversion of data of a lane, 64 paths of data, namely a $0^{th}$ path of data to a $63^{rd}$ path of data, are formed, and a bit of data in a path of data is transmitted once, wherein a1 represents 64 bits of data received at previous receiving time, and a0 represents 64 bits of data received and stored at current receiving time.

If n=i=64, 64 data segments with the length of 64 bits are extracted by using 64 detection windows, wherein the number of different bits contained by two adjacent data segments is 1.

For example, a data segment extracted by using a detection window 1 contains a $0^{th}$ path of data to a $63^{rd}$ path of data in a1; the data segment extracted by using the detection window 1 contains a $62^{nd}$ path of data to a $0^{th}$ path of data in a1 and a $63^{rd}$ path of data in a1; a data segment extracted by using a detection window 2 contains a $61^{st}$ path of data to a $0^{th}$ path of data in a1 and a $63^{rd}$ path of data to a $62^{nd}$ path of data in a0; a data segment extracted by using a detection window 3 contains a $60^{th}$ path of data to a $0^{th}$ path of data in a1 and a $63^{rd}$ path of data to a $61^{st}$ path of data in a0; a detection window 4 to a detection window 62 use such analogy; and a data segment extracted by using a detection window 63 contains a $0^{th}$ path of data in a1 and a $63^{rd}$ path of data to a $1^{st}$ path of data in a1. Parts covered by shadows in the figure are data in a0.

Thus, each 64-path data continuously distributed in a lane is operated by using 64 detection windows, wherein the difference between different data bit numbers within adjacent detection windows is 1.

When n=i, the detection unit detects a data frame bit by bit within a detection period. Thus, within a detection period, it may be determined whether the data frame is normal and where a frame header sequence is specifically located.

When n is less than i, extracting the n data segments of the frame header data of each of the data frames within the n detection windows further includes:

dividing the $x^{th}$ detection data set into n data detection sub-sets, each data detection sub-set including continuously-distributed i+(i/n)−1-path data, wherein two adjacent data detection sub-sets include identical i/n-path data;

extracting, by means of each detection window, a $(y-1)^{th}$ data segment in a corresponding data detection sub-set within a $y^{th}$ detection period; and extracting, by means of each detection window, a $y^{th}$ data segment in the corresponding data detection sub-set within a $(y+1)^{th}$ detection period, y being an integer not less than 1, wherein one data frame is detected within one detection period.

Figure 8:
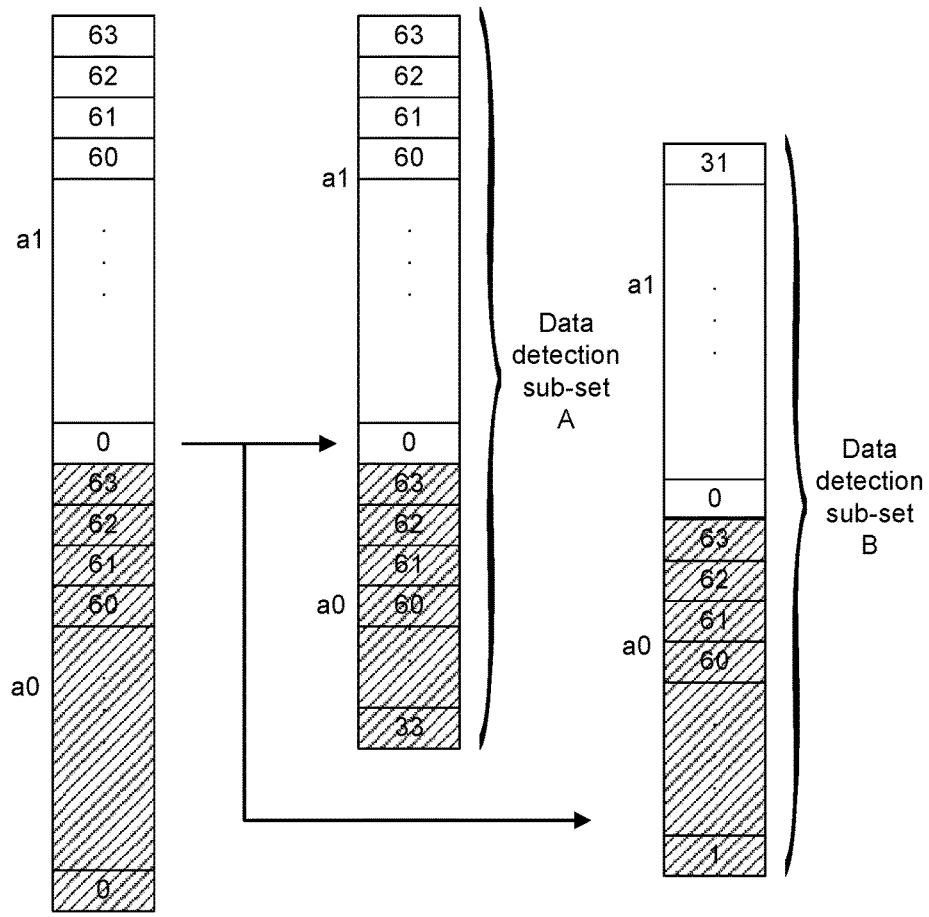
FIG. 8 is a third flowchart showing extraction of n data segments according to a method embodiment 2 of the disclosure.

As shown in FIG. 8, there are two detection windows, namely a detection window A and a detection window B, the detection window A and the detection window B being extracted data segments with the length of 64 bits, wherein a data detection sub-set detected by the detection window A is a data detection sub-set A, the data detection sub-set A including a $63^{rd}$ path of data to a $0^{th}$ path of data in a1 and a $63^{rd}$ path of data to a $33^{rd}$ path of data in a0. A data detection sub-set detected by the detection window B is a data detection sub-set B, the data detection sub-set B including a $31^{st}$ path of data to a 0th path of data in a1 and a $63^{rd}$ path of data to a $1^{st}$ path of data in a0.

Within the first detection period, the $63^{rd}$ path of data to the $0^{th}$ path of data in a1 will be extracted by means of the detection window A to form the data segment; and within the second detection period, the $62^{nd}$ path of data to the $0^{th}$ path of data in a1 and the $63^{rd}$ path of data in a0 will be extracted by means of the detection window A to form the data segment, and so on.

Within the first detection period, the $31^{st}$ path of data to the $0^{th}$ path of data in a1 and the $63^{rd}$ path of data to the $32^{nd}$ path of data in a0 will be extracted by means of the detection window B to form the data segment; and within the second detection period, the $30^{th}$ path of data to the $0^{th}$ path of data in a1 and the $63^{rd}$ path of data to the $31^{st}$ path of data in a0 will be extracted by means of the detection window B to form the data segment, and so on.

Frame header sequences of two synchronization frames under an identical synchronization mechanism are usually located at an identical position in a frame header of a data frame, so when the frame header sequences are not detected within this frame, the next frame may be detected on the basis of a detection result within this frame, thus detecting data frames with identical frame header formats by using a plurality of detection periods, and positioning the frame header sequences.

Compared with the method adopted in case of n=i, this method may simplify the structure of the detection unit of the receiving end.

The correlation operation in Step S222 may be a comparison operation, capable of obtaining a differential bit number between the extracted data segment and the local sequence by means of a comparison result, or may be an exclusive-OR logic operation, capable of obtaining the differential bit number between the extracted data segment and the local sequence by means of an exclusive-OR logic operation result, wherein the local sequence is pre-stored at the receiving end, and is identical to a frame header sequence inserted into a data frame at a sending end.

In Step S230, the positions of the frame header sequences in the data frames are determined according to the differential bit number between the extracted data segment and the local sequence. When the differential bit number between the data segment and the local sequence is less than a lower threshold limit, it may be considered that the data segment corresponds to the positions of the frame header sequences and received data is normal. When the differential bit number between the data segment and the local sequence is greater than an upper threshold limit, it may be considered that the data segment corresponds to the positions of the frame header sequences and received data is inverted. When the differential bit number between the data segment and the local sequence is less than or equal to the upper threshold limit and greater than or equal to the lower threshold limit, data is abnormal.

Based on the foregoing solutions, the method may further include:

when it is detected that frame header sequences of successive m1 data frames are located at a first position respectively, determining that frame synchronization with the sending end is achieved, wherein m1 is an integer not less than 1.

m1 is a preset value. After it is determined that frame synchronization with the sending end is achieved, data is extracted at the first position preferably during subsequent detection of the frame header sequences, the correlation operation is performed with the local sequence, and it is judged whether data segments acquired at the first position are the frame header sequences.

The method may further include:

after determining that frame synchronization with the sending end is achieved, when it is detected that frame header sequences of successive m2 data frames are not located at the first position any longer, determining that frame synchronization with the sending end fails.

After it is determined that frame synchronization with the sending end fails, the steps may be repeatedly executed.

In a specific implementation process, after it is detected, for the first time, that a data frame is located at a first position, when a next data frame is received, a data segment at the first position is extracted firstly, and it is judged whether the data segment is a frame header sequence. If not, Step S221 is returned, and if so, frame header detection of the next data frame is entered. The foregoing steps are repeated until it is detected that frame header sequences of m1 data frames are located at the first position respectively, so it is determined that frame synchronization is achieved between the receiving end and the sending end.

The frame header of the data frames further include system synchronization information.

Figure 9:
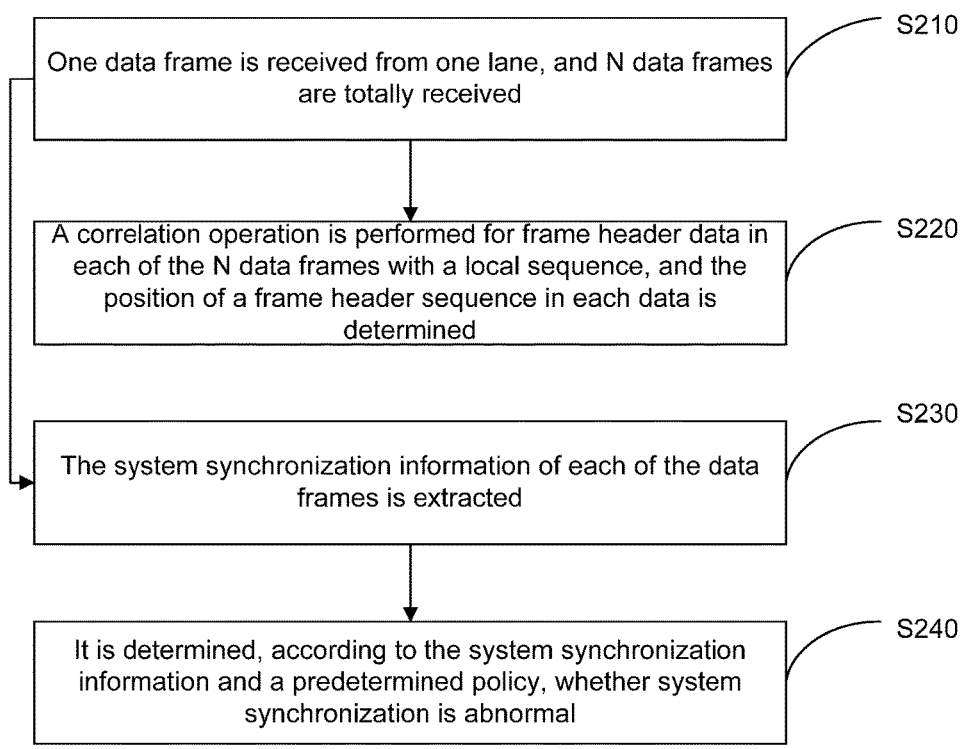
FIG. 9 is a second flowchart of a synchronization method according to a method embodiment 2 of the disclosure.

As shown in FIG. 9, the method of this embodiment may further include the following steps.

Step S230: The system synchronization information of each of the data frames is extracted.

Step S240: It is determined, according to the system synchronization information and a predetermined policy, whether system synchronization is abnormal.

The frame header of the data frames in this embodiment further include system synchronization information, so Step S230 further includes: extracting the system synchronization information, wherein the method for extracting the system synchronization information may refer to the method for extracting the frame header sequences.

The predetermined policy in Step S240 is a policy implemented, determined and stored at the receiving end. There are many specific implementation modes. The following preferred modes may be adopted.

Determining, according to the system synchronization information and the predetermined policy, whether synchronization of communication system including the receiving end and the sending end is abnormal includes:

when system synchronization information in any of the N data frames are identical, determining that system synchronization between the receiving end and the sending end is abnormal.

Under normal conditions, a time sequence in which the receiving end receives data frames shall be consistent with a sequence in which the sending end sends data frames. System synchronization sequences of any two data frames sent by the sending end at t2 are different. If system synchronization sequences of two data frames received by the receiving end at t3 are identical, system transmission and processing abnormality and system non-synchronization are determined, wherein t3 is later than t2.

Besides, vector data is divided into I-path data and Q-path data, the I-path data being carried in a first data frame, and the Q-path data being carried in a second data frame.

The N lanes are divided into J lane sets, a lane in one of the lane sets is configured to receive the first data frame, and the other lane is configured to receive the second data frame, J being an integer not less than 1.

Determining, according to the system synchronization information and the predetermined policy, whether synchronization of communication system including the receiving end and the sending end is abnormal further includes:

when the first data frame and the second data frame are received from different lane sets, determining that system synchronization between the receiving end and the sending end is abnormal.

Two data frames corresponding to an identical data vector will be sent in an identical lane set usually. If the first data frame and the second data frame appear in two different lane sets, it is determined that system synchronization is abnormal in this case.

In a specific implementation process, two adjacent lanes are regarded as a lane set usually. For example, as for a transmission channel having four lanes, a $0^{th}$ channel and a $1^{st}$ channel are regarded as a lane set usually, and a $2^{nd}$ channel and a $3^{rd}$ channel are regarded as a lane set. In this case, if a first data frame corresponding to a data vector appears in the $1^{st}$ channel, a second data frame appears in the $3^{rd}$ channel, and it is determined that system synchronization is abnormal in this case.

Based on the foregoing solutions, in order to simplify representation of system synchronization information, the system synchronization information and lane identification information of the lanes have a mapping relationship. The specific lane identification information may be identification information such as lane serial numbers or lane names.

A serial number 1 of a $1^{st}$ lane is inserted into a frame header of a data frame sent on the $1^{st}$ lane, and a serial number a of an $a^{th}$ lane is inserted into a frame header of a data frame sent on the $a^{th}$ lane, such that system synchronization information in data frames sent by different lanes are different, and it is impossible to send two data frames with identical system synchronization information at the same time.

Besides, two data frames corresponding to an identical data vector are sent by means of an identical lane set. If in this case, an $a^{th}$ lane and an $a+1^{th}$ lane belong to one lane set, a data frame sent by the $a^{th}$ lane carries lane identification information of the $a^{th}$ lane, and a data frame sent by the $(a+1)^{th}$ lane carries lane identification information of the $(a+1)^{th}$ lane. If the lane identification information of the data frame received from the $(a+1)^{th}$ lane is $(a+1)$ and lane identification information of the data frame received from an $(a+2)^{th}$ lane is a, it is determined that system synchronization is abnormal.

In a specific implementation process, system synchronization information adopted in data frames received from an identical lane may be different, after the sending end continuously sends a predetermined number of data frames by first system synchronization information over an identical lane and sends subsequent data frames by second synchronization information, if the receiving end detects the system synchronization information in a mode similar to the mode of detecting a frame header sequence, that is, the receiving end detects system synchronization sequences corresponding to the system synchronization information in the data frames by a local system synchronization sequence, the receiving end counts the received data frames carrying the identical system synchronization information correspondingly, and when a count value reaches a specified value, the local system synchronization sequence is updated.

If, when one of two data frames received at the same receiving time carries first system synchronization information, the other data frame carries second system synchronization information, and the first system synchronization information and the second system synchronization information correspond to an identical lane, it may be determined that system synchronization is abnormal.

Method Embodiment 3

Figure 10:
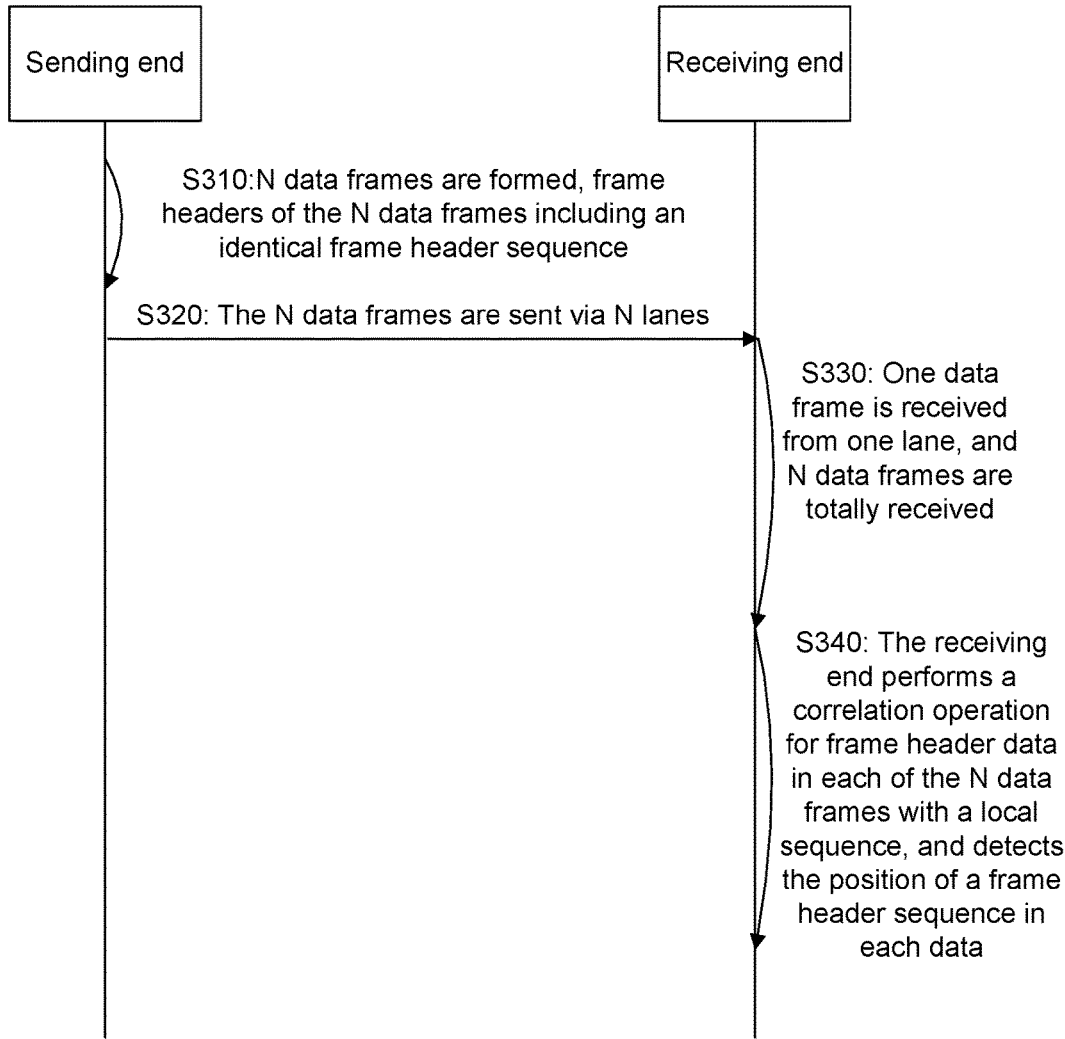
FIG. 10 is a flowchart of a synchronization method according to a method embodiment 3 of the disclosure.

As shown in FIG. 10, this embodiment provides a synchronization method, which includes the following steps.

Step S310: A sending end forms N data frames, frame header of the N data frames including an identical frame header sequence, and N being greater than or equal to 1 and less than or equal to the number of lanes M.

Step S320: The sending end sends the N data frames via N lanes, wherein different data frames are sent by different lanes, the frame header sequence being configured to perform frame synchronization between a receiving end and the sending end or to check frame synchronization.

Step S330: The receiving end receives a data frame from a lane, and totally receives N data frames, wherein N is greater than or equal to 1 and less than or equal to the number of lanes M.

Step S340: The receiving end performs a correlation operation with frame header data in the N data frames by using a local sequence, and detects the position of a frame header sequence in each data.

In this embodiment, data frames sent by the sending end over different lanes adopt an identical frame header sequence. Thus, the sending end only needs to form a frame header sequence by a plurality of data frames, and the receiving end only needs to detect frame header sequences of different data frames by using a local sequence, thereby simplifying insertion of the frame header sequences, reducing the detection complexity of the frame header sequences, and reducing the overhead of a system.

Further, the frame header of the data frames further include system synchronization information;

system synchronization information of different data frames sent at the same time is different; and the system synchronization information is configured to provide basis for the receiving end to detect system synchronization.

The frame header of the data frames further include system synchronization information; and the method further includes that:

the receiving end extracts the system synchronization information of each of the data frames; and the receiving end determines, according to the system synchronization information and a predetermined policy, whether system synchronization is abnormal.

In a specific implementation process, the sending end inserts system synchronization information into frame header of data frames when sending the data frames, so after receiving the data frames, the receiving end will also judge, according to the system synchronization information, whether current system synchronization between the receiving end and the sending end is normal.

In this embodiment, operations executed by the sending end may refer to the technical solution in the method embodiment 1, and operations executed by the receiving end may refer to the technical solution in the method embodiment 2.

The method of this embodiment can simplify frame synchronization, can determine whether system synchronization is achieved by inserting system synchronization information into data frames, and is applied to a light transmission synchronization process, particularly to a synchronization process of multi-lane light transmission of 100G or above.

Device Embodiment 1

Figure 11:
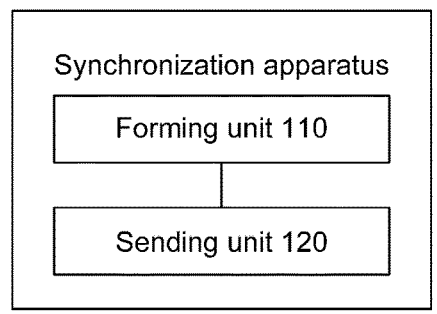
FIG. 11 is a structural diagram of a synchronization apparatus according to a device embodiment 1 of the disclosure.

As shown in FIG. 11, this embodiment provides a synchronization apparatus, which includes:

a forming unit 110, configured to form N data frames, frame header of the N data frames including an identical frame header sequence, N being greater than or equal to 1 and less than or equal to the number of lanes M, and M being an integer not less than 2; and a sending unit 120, configured to send the N data frames via N lanes, wherein different data frames are sent via different lanes.

The frame header sequence is configured to perform frame synchronization between a receiving end and a sending end or to check frame synchronization.

A specific structure of the forming unit 110 may include a processor and a storage medium. The processor and the storage medium are connected by means of a communication interface inside the synchronization apparatus and communicate with each other. Executable instructions are stored on the storage medium, the processor reads and executes the executable instructions for forming N data frames. The processor may be an electronic component having a processing function such as a Digital Signal Processor (DSP), a Micro Control Unit (MCU), a Central Processing Unit (CPU) or a Field-Programmable Gate Array (FPGA).

A specific structure of the sending unit 120 may include a wired or wireless communication interface. The wired communication interface may be a transceiver antenna specifically. The wireless communication interface may include communication interfaces such as RJ45, a coaxial cable or a twisted pair.

The synchronization apparatus of this embodiment corresponds to a synchronization apparatus of a receiving end such as a synchronization structure located in a mobile phone.

The frame header of the data frames further include system synchronization information;

system synchronization information of different data frames sent at the same time is different; and the system synchronization information is configured to provide basis for the receiving end to detect system synchronization.

Further, the system synchronization information and lane identification information of the lanes have a mapping relationship; and the sending unit 120 is configured to determine a lane for sending each of data frames according to the system synchronization identification information, and carry and send each of data frames in the determined lane.

Vector data is divided into I-path data and Q-path data; the I-path data is carried in a first data frame; the Q-path data is carried in a second data frame;

J lane sets are formed by the N lanes, each of the lane sets including two lanes, and J being an integer not less than 1; and the sending unit 120 is configured to carry and send the first data frame and the second data frame corresponding to identical vector data in different lanes of one lane set, wherein the system synchronization information is further configured to represent a binding relationship between the first data frame and the second data frame.

The sending unit 120 is further configured to replace, after one of the lanes continuously sends a predetermined number of data frames by first system synchronization information, the first system synchronization information with second system synchronization information to send subsequent data frames.

In conclusion, this embodiment provides a synchronization apparatus, which provides hardware support for the synchronization method of the method embodiment 1, may be configured to implement any technical solution in the method embodiment 1, has the advantage of simplifying frame synchronization likewise, and can achieve system synchronization according to system synchronization information.

In a specific implementation process, the number of bits occupied by the system synchronization information in a data frame is less than the number of bits occupied by the frame header sequence in the data frame.

Device Embodiment 2

Figure 12:
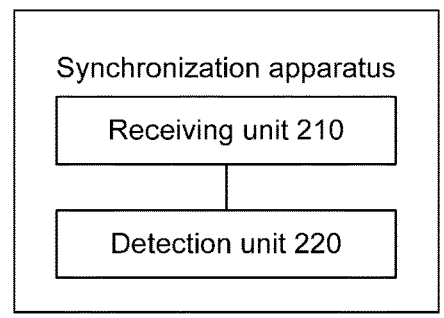
FIG. 12 is a first structural diagram of a synchronization apparatus according to a device embodiment 2 of the disclosure.

As shown in FIG. 12, this embodiment provides a synchronization apparatus, which includes:

a receiving unit 210, configured to receive a data frame from a lane, and totally receive N data frames, wherein N is greater than or equal to 1 and less than or equal to the number of lanes M; and a detection unit 220, configured to perform a correlation operation for frame header data in the N data frames with a local sequence, and detect the position of a frame header sequence in each data.

A specific structure of the receiving unit 210 may include a communication interface, for example, a wireless communication interface such as receiving antenna, and a wired communication interface such as RJ45, a coaxial cable communication interface, an optical fiber transmission interface.

A specific structure of the detection unit 220 may include a processor and a storage medium. The processor and the storage medium are connected by means of a communication interface inside the synchronization apparatus and communicate with each other. Executable instructions are stored on the storage medium, and the processor reads and executes the executable instructions for detecting the position of a frame header sequence in each of the data frames. The processor may be an electronic component having a processing function such as a Digital Signal Processor (DSP), a Microprogrammed Control Unit (MCU), a Central Processing Unit (CPU) or a Field Programmable Gate Array (FPGA).

Figure 13:
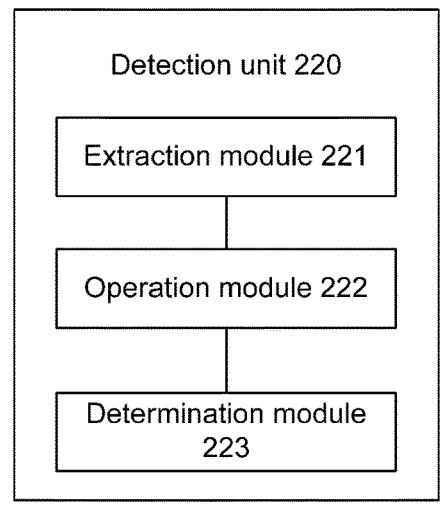
FIG. 13 is a structural diagram of a detection unit according to a device embodiment 2 of the disclosure.

As shown in FIG. 13, the detection unit 220 includes:

an extraction module 221, configured to extract n data segments of the frame header data of each of data frames within n detection windows;

an operation module 222, configured to perform the correlation operation between each of the data segments and the local sequence; and a determination module 223, configured to determine the position of the frame header sequence in each of the data frames according to a result of the correlation operation.

Herein n is an integer not less than 1.

The size of the detection window corresponds to the number of bits s occupied by the frame header sequence.

Herein, the extraction module may be a detection circuit for data extraction in the conventional structure.

The operation module may be a logic operation circuit such as a comparator, a comparison circuit or an exclusive-OR circuit.

The determination module 223 may be a processor. The processor may be an electronic component having a processing function, such as a DSP, an MCU, a CPU or an FPGA.

Figure 14:
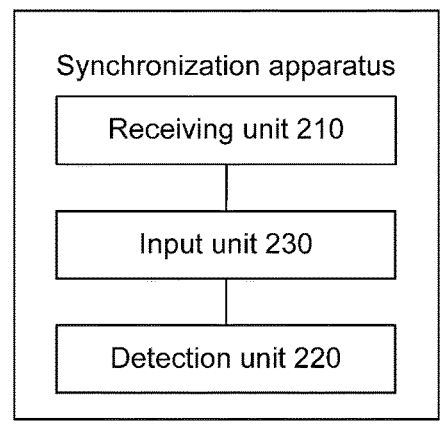
FIG. 14 is a second structural diagram of a synchronization apparatus according to a device embodiment 2 of the disclosure.

As shown in FIG. 14, the apparatus further includes:

an input unit 230, configured to input, before performing the correlation operation for the frame header data in the N data frames with the local sequence, i-path data with the degree of parallelism i formed by one of the data frames into the detection unit; and the extraction module 221 is configured to store $x^{th}$ i-path data, receive $(x+1)^{th}$ i-path data, form an $x^{th}$ detection data set by the $x^{th}$ i-path data and the $(x+1)^{th}$ i-path data, and extract s-path data continuously distributed in the detection data set within each of the detection windows to form the data segments.

Herein x is an integer not less than 1, i is an integer not less than 2, and n is less than or equal to i.

The input unit 230 may be a serial-to-parallel converter connected between the receiving unit 210 and the detection unit 220. Usually, the receiving unit 210 receives data in series, and the data is processed in series or parallel in the input unit 230.

A relationship between n and i has the following two situations.

First situation: n is equal to i.

The number of different bits included by two data segments extracted from two adjacent detection windows is 1.

The first detection method is adopted to detect. That is, within one detection period, it is detected whether all continuously-distributed data segments of one frame header of one data frame are a frame header sequence. This detection structure has a high efficiency of detection.

Second situation: n is less than i.

The detection unit 220 is configured to: divide the $x^{th}$ detection data set into n data detection sub-sets, each of the data detection sub-sets including continuously-distributed i+(i/n)−1-path data, wherein two adjacent data detection sub-sets include identical i/n-path data; extract, by means of each detection window, a $(y−1)^{th}$ data segment in a corresponding data detection sub-set within a $y^{th}$ detection period; and extract, by means of each detection window, a $y^{th}$ data segment in the corresponding data detection sub-set within a $(y+1)^{th}$ detection period.

Herein, y is an integer not less than 1.

One data frame is detected within one detection period.

As for the second detection structure, there are fewer detection circuits in the detection unit. A detection window corresponds to a detection circuit usually, and the frame header sequences are positioned by detection within a plurality of periods.

Figure 15:
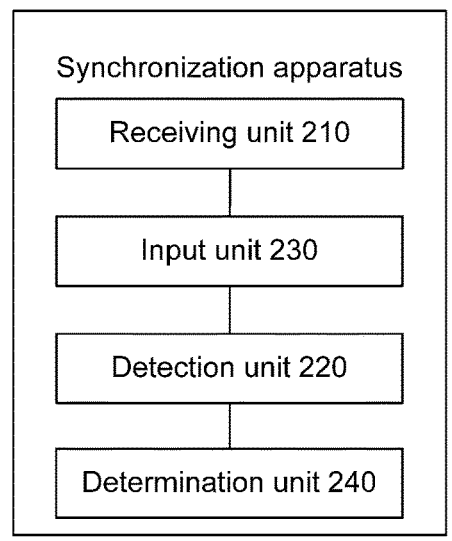
FIG. 15 is a third structural diagram of a synchronization apparatus according to a device embodiment 2 of the disclosure.

As shown in FIG. 15, the apparatus may further include a determination unit 240 configured to determine, when it is detected that frame header sequences of successive m1 data frames are all located at a first position, that frame synchronization with a sending end is achieved.

Herein m1 is an integer not less than 1.

A specific structure of the determination unit 240 may be a processor. The processor may be an electronic component having a processing function such as a DSP, an MCU, a CPU or an FPGA.

The determination unit 240 is further configured to determine, after determining that frame synchronization with the sending end is achieved, that frame synchronization with the sending end fails when it is detected that frame header sequences of successive m2 data frames are not located at the first position any longer.

Frame headers of the data frames further include system synchronization information.

Figure 16:
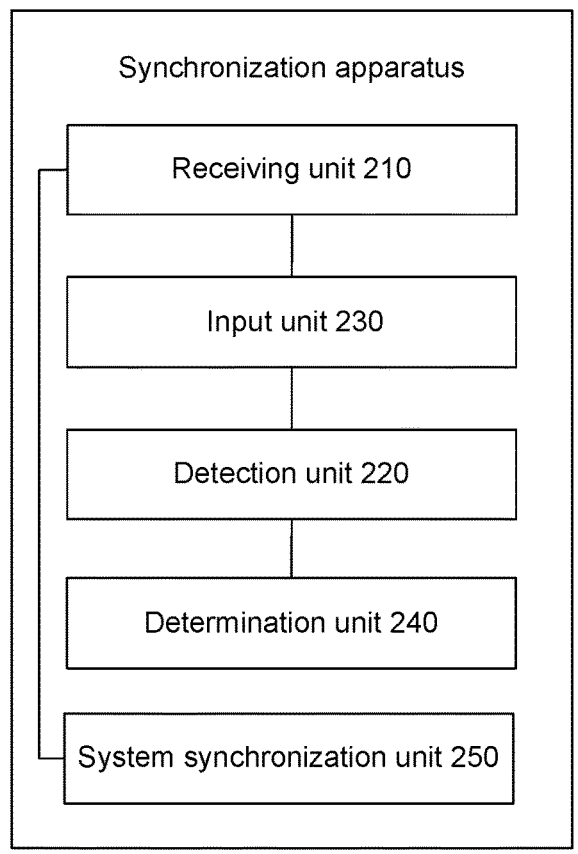
FIG. 16 is a fourth structural diagram of a synchronization apparatus according to a device embodiment 2 of the disclosure.

As shown in FIG. 16, the apparatus further includes:

a system synchronization unit 250 configured to extract the system synchronization information of each of the data frames, and determine, according to the system synchronization information and a predetermined policy, whether system synchronization is abnormal.

A specific structure of the system synchronization unit 250 may be a processor. The processor may be an electronic component having a processing function such as a DSP, an MCU, a CPU or an FPGA.

The system synchronization unit 250 may be configured to determine, when system synchronization information in any two of the N data frames are identical, that system synchronization between a receiving end and the sending end is abnormal.

Herein, vector data is divided into I-path data and Q-path data, the I-path data being carried by a first data frame, and the Q-path data being carried by a second data frame.

The N lanes are divided into J lane sets, a lane in one of the lane sets is configured to receive the first data frame, and the other lane is configured to receive the second data frame, J being an integer not less than 1.

The system synchronization unit 250 is further configured to determine, when the first data frame and the second data frame are received from different lane sets, that system synchronization between the receiving end and the sending end is abnormal.

In order to simplify detection of the system synchronization unit 250, the system synchronization information and lane identification information of the lanes have a mapping relationship.

In conclusion, this embodiment provides a synchronization apparatus, which provides hardware support for the synchronization method of the method embodiment 2, may be configured to implement any technical solution in the method embodiment 2, has the advantage of simplifying frame synchronization likewise, and can achieve system synchronization according to system synchronization information.

In a specific implementation process, when the mode of extracting the system synchronization information is identical to the mode of extracting the frame header sequence, the synchronization apparatus may further include a counter. The counter may be configured to count received data frames carrying identical system synchronization information, and local system synchronization information is updated according to the count, wherein the local system synchronization information is configured to extract system synchronization information in the data frames.

Device Embodiment 3

Figure 17:
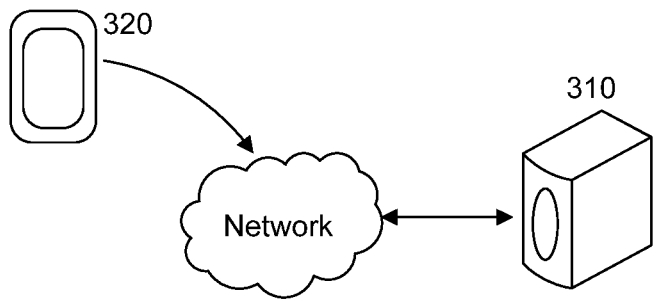
FIG. 17 is a structural diagram of a synchronization system according to a device embodiment 3 of the disclosure.

As shown in FIG. 17, this embodiment provides a synchronization system, which includes:

a sending end 310, configured to form N data frames, frame header of the N data frames including an identical frame header sequence, and N being greater than or equal to 1 and less than or equal to the number of lanes M;

the sending end 320, configured to send the N data frames via N lanes, wherein different data frames are sent via different lanes, the frame header sequence being configured to perform frame synchronization between a receiving end and the sending end or to check frame synchronization;

a receiving end 320, configured to receive one data frame from one lane, and totally receive N data frames, wherein N is greater than or equal to 1 and less than or equal to the number of lanes M; and the receiving end 320, further configured to perform a correlation operation for frame header data in the N data frames with a local sequence, and detect the position of a frame header sequence in each data.

The sending end 310 and the receiving end 320 are connected via a network. The network may be a communication network in any form such as a wired network, a wireless network or a mixed wired and wireless network.

Further, the frame header of the data frames further include system synchronization information;

system synchronization information of different data frames sent at the same time is different; and the system synchronization information is configured to provide basis for the receiving end to detect system synchronization.

The frame header of the data frames further include system synchronization information; and the receiving end 320 is further configured to extract the system synchronization information of each of the data frames, and determine, according to the system synchronization information and a predetermined policy, whether system synchronization is abnormal.

In conclusion, this embodiment provides a synchronization system, which provides hardware support for the synchronization method of the method embodiment 3, may be configured to implement any technical solution in the method embodiment 3, has the advantage of simplifying frame synchronization likewise, and can achieve system synchronization according to system synchronization information.

Several specific application examples are provided below in conjunction with the method embodiment 1 to the method embodiment 3, the device embodiment 1, and the device embodiment 3.

The synchronization system of the example includes a sending end and a receiving end.

Figure 18:
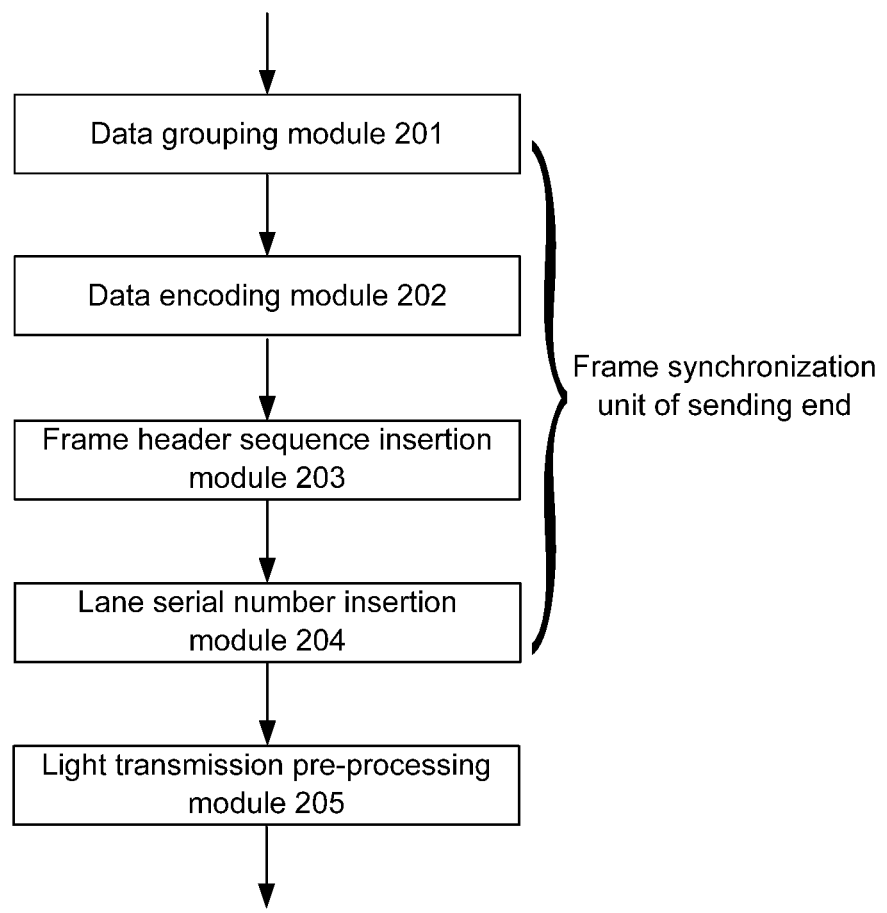
FIG. 18 is a flowchart showing data processing at a sending end according to an example of the disclosure.

The structure of the sending end is shown in FIG. 18. Input data is divided into several groups by a data grouping module 201 (if there are four lanes, data is divided into four groups, and if there are eight lanes, data is divided into eight groups, one data set corresponding to one data frame usually), in order to send the data to multiple lanes. The grouped data is original data of light transmission data, which is encoded by a data encoding module 202 so as to improve the anti-interference capability and error correcting capability of data. A frame header sequence insertion module 203 inserts a frame header sequence and a lane serial number insertion module 204 inserts Lane number information into the encoded data according to a data frame format to complete a data frame forming process. The framed data can be sent after data sending pre-processing. The lane number is a lane serial number corresponding to the system synchronization information.

Herein, the data grouping module 201, the data encoding module 202 and the frame header sequence insertion module 203 form a frame synchronization unit of the sending end.

Figure 19:
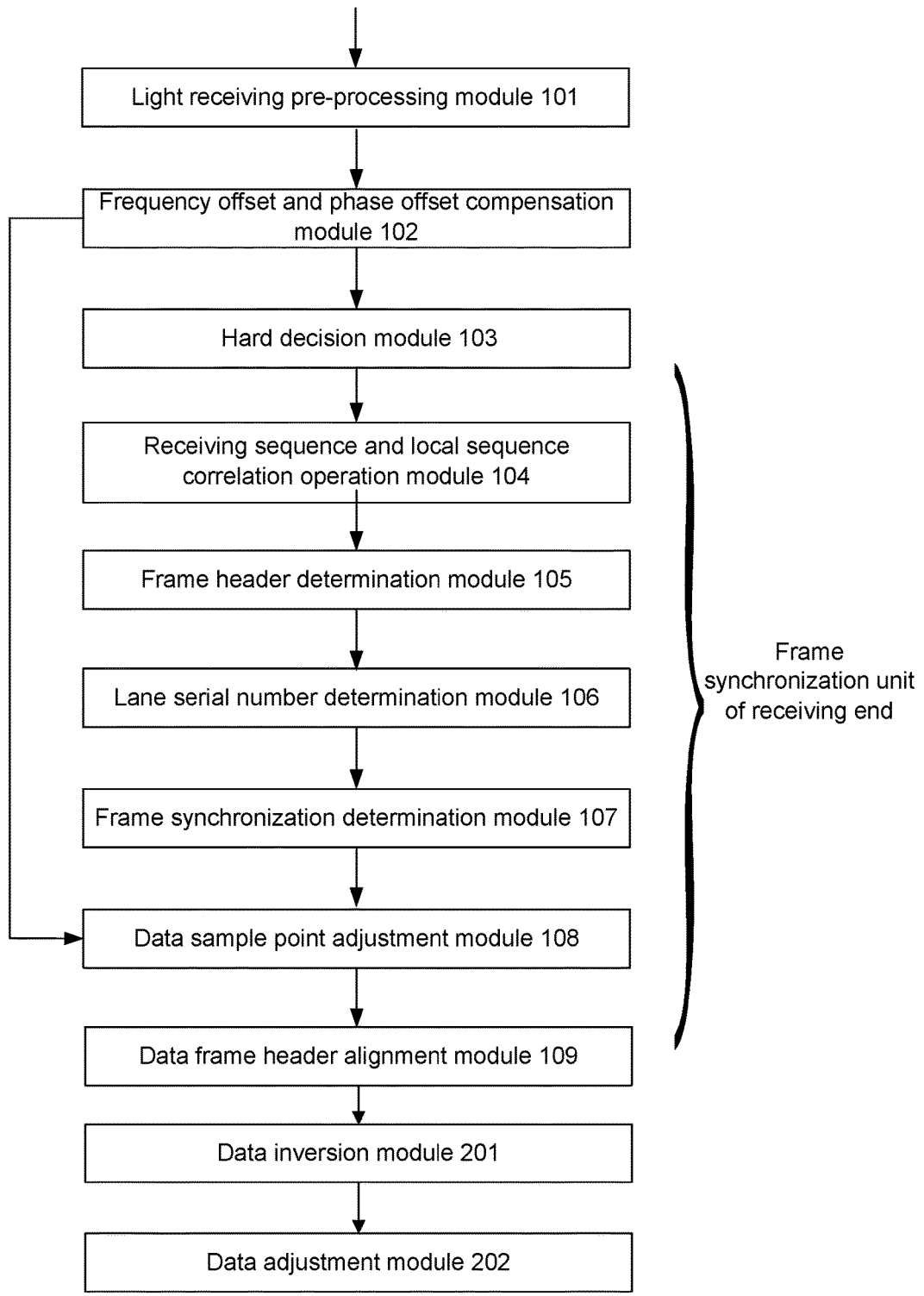
FIG. 19 is a flowchart showing data processing at a receiving end according to an example of the disclosure.

The structure of the receiving end is shown in FIG. 19. Data formed by multi-frame light signals is received from multiple lanes, processed by a light receiving pre-processing module 101, input into a frequency offset and phase offset compensation module 102, and subjected to frequency offset correction and phase offset correction and compensation to form soft information. It may be considered, by means of processing of the frequency offset and phase offset compensation module 102, that data is received stably without influence of frequency offset and phase offset. The soft information is input into a hard decision module 103, and a hard decision is made to extract symbol information of the data. After the hard decision is made, a frame header sequence is positioned by using a frame header determination module 105. The frame header sequence may be specifically determined by means of a correlation operation with a local sequence. Specifically, the frame header determination module 105 extracts one data sequence from the data frames, and calculates the number of elements (the elements herein are bits in a 01 signal), inconsistent with those in the local sequence, of the extracted data sequence. After the correlation operation, a threshold decision is made according to a correlation value obtained by the correlation operation. When the correlation value is lower than a lower discrimination threshold, it is determined that the sequence position is the frame header position and data is normal. When the correlation value is higher than an upper discrimination threshold, it is determined that the sequence position is the frame header position and data is inverted. After the frame header position is determined, if the data is inverted, the inserted Lane number is inverted and then determined, and otherwise, the Lane number is directly determined. After the frame header and the Lane number are determined, frame synchronization is determined according to a synchronization judgment mechanism of an algorithm. Under a frame synchronization state, sample point adjustment and frame header alignment of data may be performed according to the positions of frame header input in parallel. When it is judged that the correlation value is higher than the lower threshold value and lower than the upper threshold value, it may be considered that the data is abnormal, and synchronization processing is not performed according to this data frame any longer.

In order to facilitate subsequent data receiving, in a specific implementation process, the structure shown in FIG. 19 further includes a data sample point adjustment module 108 and a data frame header alignment module 109. The data sample point adjustment module 108 is configured to adjust a data frame header sequence to one-beat data transmission. Specifically, if the current degree of parallelism is 64, that is, 64 paths of data being transmitted at one time, one-time data transmission is one-beat data transmission. Herein, the data sample point adjustment module 108 is specifically configured to transmit the frame header sequence over one-beat data, so as to facilitate subsequent detection of data parts in a data frame.

Besides, the structure shown in FIG. 19 further includes the data frame header alignment module 109. The data frame header alignment module 109 is configured to align frame headers, and specifically adjust data of different lanes after the data sample point adjustment module performs frame skip to one or more whole beats of data according to the position deviation of the frame headers. The data of different lanes has sample point delays, and the sample point delays become whole beats after sample point adjustment. For example, the frame header are aligned to one or more beats, frame header sequences are extracted according to frame header positioning information, other data is sequentially extracted, and frame header positions of data may be simply aligned.

In a specific implementation process, the structure shown in FIG. 19 further includes a data inversion module 201 and a data adjustment module 202. The data inversion module 201 is configured to invert, when the correlation value is higher than the upper discrimination threshold, data of data parts in data frames, so as to facilitate subsequent receiving of data.

When the system synchronization information and lane identification information of the lanes have a mapping relationship, the data adjustment module 202 is configured to sequentially adjust data frames according to the lane identification information. For example, the sending end partitions an article into four data frames to be transmitted. A lane 0 transmits the first data frame and a lane serial number 0 is also inserted into the first data frame. Due to the characteristics of light transmission, the receiving end probably receives the first data frame at a lane 3. However, it may be confirmed, according to the lane serial number 0 corresponding to the extracted first data frame, that the data is the first data frame. Thus, after the four data frames are received, the sequence of the received data frames is adjusted, thus recovering a data sequence in which the sending end sends the data frames, so that the receiving end demodulates this article in sequence.

In a specific implementation process, the data inversion module 201 is connected to the data frame header alignment module 109. The data adjustment module 202 is positioned behind the data inversion module preferably.

The embodiment of the disclosure also provides a computer storage medium having computer executable instructions stored therein. The computer executable instructions are configured to execute at least one of the methods, specifically, as shown in FIG. 1, FIG. 4, FIG. 5, FIG. 9, or FIG. 10.

The computer storage medium may be various media capable of storing program codes, such as a U disk, a mobile hard disk, a Read-Only Memory (ROM), a Random Access Memory (RAM), a disk or an optical disc. In some embodiments, the computer storage medium is a non-transitory storage media.

If the integrated module(s) and/unit(s) of the embodiments of the disclosure are/is implemented in a software function module form and sold or used as an independent product, the product may also be stored in a computer readable storage medium. Based on this understanding, the technical solutions of the embodiments of the disclosure may be substantially embodied in a software product form or parts contributing to the conventional art may be embodied in the software product form, and a computer software product is stored in a storage medium, including a plurality of instructions enabling a computer device, which may be a personal computer, a server or a network device to execute all or some of the steps of the method according to each of embodiments of the disclosure. Thus, the embodiments of the disclosure are not limited to any combination of any specific hardware and software.

The above is only the preferred embodiments of the disclosure and not intended to limit the scope of protection of the disclosure. Any modifications made according to the principle of the disclosure shall fall within the scope of protection of the disclosure.

The invention claimed is:

1. A synchronization method, comprising:
forming N data frames, a frame header of each of the N data frames comprising an identical frame header sequence, N being greater than or equal to 1 and less than or equal to the number of lanes M, and M being an integer not less than 2; and
sending the N data frames via N lanes, wherein different data frames are sent via different lanes,
wherein the frame header sequence is configured to perform frame synchronization between a receiving end and a sending end or to check frame synchronization;
the frame header of each of the N data frames further comprise system synchronization information, system synchronization information of different data frames sent at the same time is different, the system synchronization information and lane identification information of the lanes have a mapping relationship; and
the system synchronization information is configured to provide basis for the receiving end to detect system synchronization.

2. The method according to claim 1, wherein
sending the N data frames via the N lanes is:
determining a lane for sending each of the data frames according to the system synchronization information; and
carrying and sending each of the data frames in the determined lane.

3. A synchronization method, comprising:
receiving one data frame from one lane, and totally receiving N data frames, wherein a frame header of each of the N data frames comprise an identical frame header sequence, and N is greater than or equal to 1 and less than or equal to the number of lanes M; and
performing a correlation operation for frame header data in each of the N data frames with a local sequence, and detecting a position of a frame header sequence in each of the data frames;
wherein the frame header sequence is configured to perform frame synchronization between a receiving end and a sending end or to check frame synchronization;
the frame header of each of the N data frames further comprise system synchronization information; system synchronization information of different data frames sent at the same time is different, the system synchronization information and lane identification information of the lanes have a mapping relationship; and
the system synchronization information is configured to provide basis for the receiving end to detect system synchronization.

4. The method according to claim 3, wherein performing the correlation operation for the frame header data in the N data frames with the local sequence comprises:
extracting n data segments of the frame header data of each of the data frames within n detection windows;
performing the correlation operation for each of data segments and the local sequence; and
determining the position of the frame header sequence in each of the data frames according to a result of the correlation operation,
wherein n is an integer not less than 1,
the size of the detection window corresponds to the number of bits s occupied by the frame header sequence, and
s is an integer not less than 1.

5. The method according to claim 3,
further comprising:
extracting the system synchronization information of each of the data frames; and
determining, according to the system synchronization information and a predetermined policy, whether system synchronization is abnormal.

6. A synchronization apparatus, comprising:
a processor, configured to form N data frames, a frame header of each of the N data frames comprising an identical frame header sequence, N being greater than or equal to 1 and less than or equal to the number of lanes M, and M being an integer not less than 2; and
a communication interface, configured to send the N data frames via N lanes, wherein different data frames are sent via different lanes,
wherein the frame header sequence is configured to perform frame synchronization between a receiving end and a sending end or to check frame synchronization;
the frame header of each of the N data frames further comprise system synchronization information, system synchronization information of different data frames sent at the same time is different, the system synchronization information and lane identification information of the lanes have a mapping relationship; and
the system synchronization information is configured to provide basis for the receiving end to detect system synchronization.

7. The apparatus according to claim 6, wherein
the communication interface is configured to determine a lane for sending each of data frames according to the system synchronization information, and carry and send each of the data frames in the determined lane.

8. A synchronization apparatus, comprising:
a communication interface, configured to receive one data frame from one lane, and totally receive N data frames, wherein a frame header of each of the N data frames comprise an identical frame header sequence, and N is greater than or equal to 1 and less than or equal to the number of lanes M; and
a processor, configured to perform a correlation operation for frame header data in each of the N data frames with a local sequence, and detect a position of a frame header sequence in each of the data frames;
wherein the frame header sequence is configured to perform frame synchronization between a receiving end and a sending end or to check frame synchronization;
the frame header of each of the data frames further comprise system synchronization information, system synchronization information of different data frames sent at the same time is different, the system synchronization information and lane identification information of the lanes have a mapping relationship; and the system synchronization information is configured to provide basis for the receiving end to detect system synchronization.

9. The apparatus according to claim 8, further comprising:
a detection circuit, configured to extract n data segments of the frame header data of each of the data frames within n detection windows; and
a comparator, configured to perform the correlation operation for each of the data segments and the local sequence;
the processor is further configured to determine the position of the frame header sequence in each of the data frames according to a result of the correlation operation,
wherein n is an integer not less than 1,
the size of the detection window corresponds to the number of bits s occupied by the frame header sequence, and
s is an integer not less than 1.

10. The apparatus according to claim 8, wherein
the processor is further configured to extract the system synchronization information of each of the data frames, and determine, according to the system synchronization information and a predetermined policy, whether system synchronization is abnormal.

11. A non-transitory computer storage medium having computer executable instructions stored therein, wherein the computer executable instructions are configured to execute a synchronization method, comprising:
forming N data frames, a frame header of each of the N data frames comprising an identical frame header sequence, N being greater than or equal to 1 and less than or equal to the number of lanes M, and M being an integer not less than 2; and
sending the N data frames via N lanes, wherein different data frames are sent via different lanes,
wherein the frame header sequence is configured to perform frame synchronization between a receiving end and a sending end or to check frame synchronization;
the frame header of each of the N data frames further comprise system synchronization information, system synchronization information of different data frames sent at the same time is different, the system synchronization information and lane identification information of the lanes have a mapping relationship; and
the system synchronization information is configured to provide basis for the receiving end to detect system synchronization.

\* \* \* \* \*